United States Patent
Buerge et al.

(10) Patent No.: US 8,608,847 B2
(45) Date of Patent: Dec. 17, 2013

(54) ACCELERATOR FOR HYDRAULIC BINDERS

(75) Inventors: Christian Buerge, Schafisheim (CH); Franz Wombacher, Jonen (CH); Christophe Kurz, Endingen (CH); Beat Marazzani, Oberengstringen (CH); Gilbert Maeder, Marthaien (CH); Ueli Sulser, Unterengstringen (CH)

(73) Assignee: Sika Technology AG, Baar (CH)

( * ) Notice: Subject to any disclaimer, the term of this patent is extended or adjusted under 35 U.S.C. 154(b) by 0 days.

(21) Appl. No.: 13/810,843

(22) PCT Filed: Aug. 24, 2011

(86) PCT No.: PCT/EP2011/064553
§ 371 (c)(1),
(2), (4) Date: Jan. 17, 2013

(87) PCT Pub. No.: WO2012/025567
PCT Pub. Date: Mar. 1, 2012

(65) Prior Publication Data
US 2013/0112116 A1 May 9, 2013

(30) Foreign Application Priority Data
Aug. 24, 2010 (EP) .................................... 10173833

(51) Int. Cl.
*C04B 40/00* (2006.01)
*C04B 24/24* (2006.01)
*C04B 28/02* (2006.01)

(52) U.S. Cl.
USPC ........... 106/806; 106/630; 106/691; 106/724; 106/781; 106/795; 106/823

(58) Field of Classification Search
USPC .......... 106/806, 823, 630, 691, 724, 781, 795
See application file for complete search history.

(56) References Cited

FOREIGN PATENT DOCUMENTS

| EP | 0 508 158 A2 | 10/1992 |
|---|---|---|
| WO | WO 2004/024647 A1 | 3/2004 |
| WO | WO 2010/026155 A1 | 3/2010 |

OTHER PUBLICATIONS

Georg Thieme Verlag, "Wasserglas," *ROMPP Online, Version 3.30*, 2013.
International Search Report issued in International Application No. PCT/EP2011/064553 dated Dec. 13, 2011.
Feb. 26, 2013 International Preliminary Report on Patentability issued in International Application No. PCT/EP2011/064553; with English-language translation.

*Primary Examiner* — Anthony J Green
(74) *Attorney, Agent, or Firm* — Oliff & Berridge, PLC

(57) ABSTRACT

The invention relates to additives for hydraulic binders and systems produced from them, such as concrete and mortar. In particular, the present invention relates to a setting and hardening accelerator for hydraulic binders produced by means of reaction of a calcium compound CV with a silicon compound SV and addition of a phosphonic acid derivative, as well as its production.

14 Claims, No Drawings

ACCELERATOR FOR HYDRAULIC BINDERS

TECHNICAL FIELD

The invention relates to additives for hydraulic binders and systems produced from them, such as concrete and mortar. In particular, the present invention relates to a setting and hardening accelerator for hydraulic binders, produced by means of reaction of a calcium compound CV with a silicon compound SV and addition of a phosphonic acid derivative, as well as its production.

STATE OF THE ART

In the case of concrete or steel-reinforced concrete prefabricated components or in the case of roadway or track renovations, great early strength is increasingly in demand, so that prefabricated components can already be deshuttered, transported, stacked, or biased after a few hours, or the roadways or tracks can be driven on. In order to achieve this goal in practice, aside from high-performance concrete formulations, such as low w/c mix or high cement content, heat or steam treatments are also often applied. These treatments require a lot of energy, so that because of rising energy prices, significant investment costs, and problems in connection with permanence and exposed concrete, these treatments are increasingly being abstained from, and other ways for accelerating the hardening process are being sought.

Accelerating additives have not been a satisfactory alternative to heat or steam treatments up to the present. It is true that many substances are known that accelerate setting and hardening of concrete, but such additives, containing calcium compounds with silicon compounds, often have the disadvantage that they are so highly viscous in their consistency that their production and use, particularly metering, is complicated. Furthermore, use of known accelerating additives leads to greatly reduced processability of the concrete, as the result of a significant reduction in the flow table spread of the concrete.

PRESENTATION OF THE INVENTION

It is therefore the task of the present invention to make available accelerating additives as well as methods for their production, which do not demonstrate the disadvantages mentioned above.

Surprisingly, it was found that this can be achieved by means of the method for the production of a setting and hardening accelerator for hydraulic binders in accordance with claim 1.

Further aspects of the invention are the object of further independent claims. Particularly preferred embodiments of the invention are the object of the dependent claims.

WAYS OF IMPLEMENTING THE INVENTION

In a first aspect, the present invention comprises a method for the production of a setting and hardening accelerator, also called accelerator hereinafter, for hydraulic binders, comprising a Step:

(i) for reaction of a calcium compound CV with a silicon compound SV; as well as a Step
(ii) for addition of a phosphonic acid derivative having the formula (I)

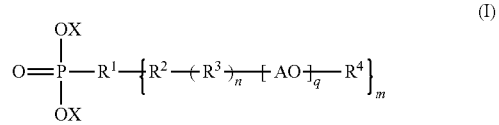

where X stand for $H^+$, alkali metal ion, earth alkali metal ion, bivalent or trivalent metal ion, ammonium ion, organic ammonium group or a radical having the formula (II)

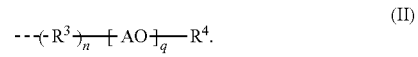

Preferably, X stand for $H^+$, alkali metal ion, earth alkali metal ion or a radical having the formula (II), particularly for $H^+$, alkali metal ion or earth alkali metal ion.
$R^1$ stands for an organic radical with 1 to 10 C atoms,
$R^2$ independent of one another for

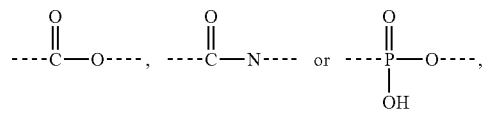

preferably for

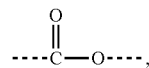

$R^3$ for an alkyl group with 1 to 6 C atoms,
$R^4$ for H, an alkyl group, preferably with 1 to 20 C atoms, an alkyl aryl group, preferably with 7 to 20 C atoms.
The substituent A stands, independent of one another, for a C2 to C4 alkylene group, the index q for a value from 2 to 300, particularly from 2 to 50, particularly preferably from 3 to 10, the index m for a value from 1 to 4, preferably for a value of 3, the index n for a value from 0 to 1.

Phosphonic acid derivatives having the formula (I) can be obtained, for example, by means of esterification or amidization of phosphonic acid compounds with polyoxyalkylene compounds.

Suitable phosphonic acid compounds, which yield phosphonic acid derivatives having the formula (I) by means of esterification or amidization with polyoxyalkylene compounds, are selected, for example, from the group consisting of [bis(phosphonomethyl)amino]methylphosphonic acid, [2-[bis(phosphonomethyl)amino]ethyl-(phosphononnethyl)-amino]methylphosphonic acid, [2-[2-[bis(phosphonomethyl)amino]ethyl-(phosphonomethyl)amino]ethyl-(phosphonomethyl)amino]methyl-hydroxyphosphinic acid, [6-[bis(phosphonomethyl)amino]hexyl-(phosphono-methyl)amino]methylphosphonic acid and [bis[6-[bis(phosphonomethyl)amino]-hexyl]amino]methylphosphonic acid.

Preferred are phosphonic acid derivatives that contain carboxylic acid groups; particularly preferred are phosphonic acid derivatives selected from the group consisting of 1-phosphonobutane-1,2,4-tricarboxylic acid, 2-phosphonobutane-1,2,4-tricarboxylic acid, 3-phosphonobutane-1,2,4-tricarboxylic acid, 4-phosphonobutane-1,2,4-tricarboxylic acid, 2,4-diphosphonobutane-1,2,4-tricarboxylic acid, 2-phosphonobutane-1,2,3,4-tetracarboxylic acid, 1-methyl-2-phosphonopentane-1,2,4-tricarboxylic acid, 1,2-phosphonoethane-2-dicarboxylic acid, 1-phosphonoethane-2-carboxylic acid, 1,2-phosphonoethane-2-dicarboxylic acid, and 1-phosphonoethane-2-carboxylic acid.

Suitable polyoxyalkylene compounds that yield phosphonic acid derivatives having the formula (I) by means of esterification or amidization with phosphonic acid compounds are polyoxyalkylene compounds that are terminated at one end with end groups that are not reactive under usual reaction conditions and are hydroxy-functionalized or amine-functionalized at the end.

'Terminated with end groups that are not reactive under usual reaction conditions' is understood to mean, in the sense of the invention, that in place of functional groups that are reactive for esterification or amidization, groups that are no longer enabled for a reaction are present. The usual reaction conditions are those that a person skilled in the art knows for esterifications and amidizations. In the case of compounds 'terminated at one end,' only one side is no longer capable of reaction.

Suitable polyoxyalkylene compounds are, for example, polymerization products of ethylene oxide, 1,2-propylene oxide, 1,2- or 2,3-butylene oxide, oxetane, tetrahydrofuran or mixtures thereof, if applicable polymerized using a starter molecule with two or more active hydrogen atoms such as, for example, water or compounds with one or two, preferably one OH or NH group(s) such as, for example, methanol, ethanol, propanol, 1,2-ethane diol, 1,2- and 1,3-propane dial, neopentyl glycol, diethylene glycol, triethylene glycol, the isomer dipropylene glycols and tripropylene glycols, the isomer butane diols, pentane dials, hexane diols, heptane diols, octane diols, nonane diols, decane dials, undecane diols, 1,3- and 1,4-cyclohexane dimethanol, bisphenol A, hydrogenated bisphenol A, as well as mixtures of the aforementioned compounds.

Further suitable polyoxyalkylene compounds that are amine-functionalized at one end are, for example, aliphatic monoamines that contain ether groups, particularly polyoxyalkylene monoamines. These are available, for example, under the name Jeffamine (from Huntsman). Particularly suitable polyoxyalkylene monoamines are Jeffamine® M-600, Jeffamine® M-1000, Jeffamine® M-2005, and Jeffamine® M-2070.

Polyoxyethylene glycols and polyoxypropylene glycols are particularly suitable as polyoxyalkylene compounds that yield phosphonic acid derivatives having the formula (I) by means of esterification or amidization with phosphonic acid compounds. Polyoxyalkylene glycols with a molecular weight in the range of 300 to 5,000 g/mol, particularly 400 to 4,000 g/mol, are particularly suitable.

The proportion of the phosphonic acid derivative having the formula (I) preferably amounts to 0.01-10 wt.-%, particularly preferably 0.1 to 2 wt.-%, with reference to the total weight of the setting and hardening accelerator.

The calcium compound CV is typically selected from the group consisting of calcium chloride, calcium nitrate, calcium formiate, calcium acetate, calcium bicarbonate, calcium bromide, calcium citrate, calcium chlorate, calcium hydroxide, calcium oxide, calcium hypochloride, calcium iodates, calcium iodide, calcium lactate, calcium nitrite, calcium phosphate, calcium propionate, calcium sulfate, calcium sulfate-hemihydrate, calcium sulfate-dihydrate, calcium sulfide, calcium tartrate, calcium gluconate, calcium sulfamate, calcium maleinate, calcium fumarate, calcium adipate, and calcium aluminate. Preferably, the calcium compound CV is a calcium compound easily soluble in water; most preferred are calcium nitrate, calcium acetate, and calcium sulfamate.

The silicon compound SV is typically selected from the group consisting of sodium silicate, potassium silicate, lithium silicate, water glass, silicic acid, sodium metasilicate, potassium metasilicate, di-sodium metasilicate, di-potassium metasilicates, silicon dioxide, di-sodium disilicate and di-sodium trisilicate. Preferably, the silicon compound SV is a water-soluble silicon compound; most preferred are water glasses, particularly sodium silicate and potassium silicate.

In the present document, the term "water glass" is understood to mean water-soluble salts of silicic acids, particularly potassium and sodium silicates or their aqueous solutions, which have solidified from the melt flow, as they are described in CD Römpp Chemie Lexikon, Version 1.0, Georg Thieme Verlag, Stuttgart 1995.

If the silicon compound SV is sodium silicate, a molar ratio of $SiO_2:Na_2O=0.5$-$4.0$, preferably 0.8-2, particularly 1.0-1.5 is preferred.

If the silicon compound SV is potassium silicate, a molar ratio of $SiO_2:K_2O=0.5$-$4.0$, preferably 0.8-2, particularly 1.0-1.5 is preferred.

The reaction of the calcium compound CV with the silicon compound SV in Step (i) preferably takes place in the presence of water, particularly in water. Furthermore, it is advantageous if the calcium compound CV and the silicon compound SV are added to the water separately from one another.

The reaction in Step (i) preferably takes place in a liquid-phase reactor selected from the group consisting of Sulzer mixer reactor, reactor with external recirculation, reactor with internal recirculation, cascade reactor, loop reactor, and stirrer reactor. Preferred liquid-phase reactors are, in particular, stirrer reactors and static mixers.

The addition of the phosphonic acid derivative having the formula (I) in Step (ii) can take place before and/or during and/or after Step (i).

Preferably, the phosphonic acid derivative having the formula (I) is added before Step (i); in this case, it is advantageous to add the phosphonic acid derivative having the formula (I) to the calcium compound CV and the silicon compound SV separately from one another. Preferably, 10-100 weight-%, preferably 30-70 weight-%, of the added phosphonic acid derivative having the formula (I) is added to the calcium compound CV. Particularly preferably, the addition of the phosphonic acid derivative having the formula (I) takes place at 50-70 weight-% to the calcium compound CV and at 30-50 weight-% to the silicon compound SV. The addition of the phosphonic acid derivative having the formula (I) before Step (i) contributes, among other things, to a particularly advantageous flow table spread of binder compositions containing accelerators produced in this way.

However, it can also be advantageous to add the phosphonic acid derivative having the formula (I) after Step (i). The addition of the phosphonic acid derivative having the formula (I) after Step (i) but before a possible Step (v) of comminution of the reaction product from Step (i) contributes, among other things, to a particularly low viscosity of the accelerator produced in this way.

Preferably, during the course of the implementation of Step (i), the following mole ratios are present: calcium:silicon=0.5-2.0, preferably 0.8-1.5, particularly preferably 0.9-

1.2. Particularly when using the accelerators in hydraulic binders, this leads to an advantageous flow table spread at simultaneously great pressure strength after 8 hours.

In a preferred embodiment, the calcium compound CV is calcium nitrate and the silicon compound SV is sodium silicate. Preferably, the molar ratio during the reaction in Step (i) amounts to calcium nitrate:sodium silicate=0.25-8.0, preferably 0.65-3, where the sodium silicate preferably demonstrates a molar ratio $SiO_2$:$Na_2O$ of 1.0-1.5. This is particularly advantageous for achieving an advantageous flow table spread in hydraulic binders with simultaneously high pressure strength after 8 hours.

During the reaction in Step (i), a compound selected from the group consisting of aluminum salt, aluminum hydroxide, aluminum oxide, magnesium salt, magnesium hydroxide, and magnesium oxide, can furthermore be added; in particular, these salts are selected from the group consisting of nitrates and sulfates.

It can furthermore be advantageous if the method furthermore has a Step (iii) for addition of a thickening agent, particularly selected from the group consisting of cellulose ether, polysaccharides, starch derivatives, polyvinyl alcohols, and polyacrylamides, and/or furthermore a Step (iv) for addition of a compound selected from the group consisting of amino alcohols, hydroxy carboxylic acids, (earth) alkali thiocyanates, (earth) alkali halogenides, and glycerin compounds.

Furthermore, an addition of a dispersant selected from the group consisting of polycarboxylates, melamine formaldehyde condensates, naphthalene sulfonates, lignin sulfonates, and polyoxyalkylenes can be advantageous. However, it can also be advantageous if none of the aforementioned dispersants are added.

Typically, in the method, Step (i) is carried out at a temperature of −10-90° C., a pH of 6-14 and a pressure of 0.8-20 bar.

It is particularly advantageous for the early strength resulting from the accelerator if the method furthermore has a Step (v) of comminution of the reaction product from Step (i). In particular, Step (v) involves comminution by means of stirrer mills, roller stands, colloid mills and/or homogenizers, preferably by homogenizers.

Preferably, Step (v) leads to an average particle size of the reaction product of 1000-10, preferably 100-10 nm. This is particularly advantageous for the early strength that results from the accelerator.

In another aspect, the present invention relates to a setting and hardening accelerator produced according to one of the methods indicated below. Preferably, the setting and hardening accelerator is present as a powder, particularly as a colloid, suspension or as an aqueous solution.

The setting and hardening accelerator according to the invention finds use in various sectors, particularly in concrete and cement technology. The accelerator has particularly good properties as an accelerator for hydraulically setting compositions, in other words it can be used for accelerating setting and hardening of hydraulic binders, particularly of quick cement, as well as mortar or concrete produced from it. Furthermore, mortar or concrete that has a high early and final strength can be produced with the accelerator according to the invention. The setting and hardening accelerator according to the invention is therefore particularly well suited if it must be possible to put a load on or walk on the hydraulically setting composition very quickly after application, for example in road or bridge construction, in the prefabrication of concrete elements in the case of concrete and steel-reinforced prefabricated concrete components, or in the case of track renovations, particularly airport runways, so that the prefabricated parts can already be deshuttered, transported, stacked or biased, or the roadways or tracks can be driven on.

Surprisingly, the setting and hardening accelerator according to the invention has proven itself, by means of the addition of a phosphonic acid derivative having the formula (I), as an accelerator with a low viscosity, compared with accelerators to which dispersants known in concrete technology were added. Furthermore, the accelerator according to the invention demonstrates an advantageous flow table spread in mortar or concrete produced with it, as well as good early and final strength.

Fundamentally, all hydraulically setting substances known to a person skilled in the art of concrete can be used as hydraulically setting systems or compositions. In particular, these are hydraulic binders such as cements, such as, for example, Portland cements or high-alumina cements and, respectively, their mixtures with flue ashes, silica fume, slag, foundry sands and limestone fillers. Further hydraulically setting substances in the sense of the present invention is quicklime. Cement is preferred as a hydraulically setting composition. Furthermore, admixtures such as sand, gravel, stones, quartz meal, chalks are possible, as are usual components such as concrete liquefiers, for example lignosulfonates, sulfonated naphthalene formaldehyde condensates, sulfonated melamine formaldehyde condensates, or polycarboxylate ethers, accelerators, corrosion inhibitors, delayers, shrinkage reducers, defoamers or pore formation agents as additives.

The accelerator according to the invention can be used, for the use according to the invention, both in liquid and in solid form, either alone or as a component of an additive. The invention therefore additionally relates to an additive in liquid or solid form, comprising at least one accelerator according to the invention.

In order to improve processability and to extend the processing time after addition of the accelerator according to the invention to a hydraulic binder, the additive preferably contains a liquefier in addition to the accelerator. Possible liquefiers are, for example, lignosulfonates, sulfonated naphthalene formaldehyde condensates, sulfonated melamine formaldehyde condensates, sulfonated vinyl copolymers or polycarboxylate liquefiers, as they are known, for example, in concrete chemistry, as high-performance liquefiers, or mixtures thereof.

The accelerator or the additive containing the accelerator can also contain further components. Examples of further components are solvents, particularly water, or additives such as further accelerating substance such as, for example, thiocyanates, nitrates or aluminum salts, acids or their salts or amine-containing substances such as alkanolamines, delayers, shrinkage reducers, defoamers, or foam forming agents.

If the accelerator according to the invention or the additive containing the accelerator are used in liquid form, a solvent is preferably used for implementation. Preferred solvents are, for example, hexane, toluene, xylene, methylcyclohexane, cyclohexane or dioxane, as well as alcohols, particularly ethanol or isopropanol, and water, where water is the most preferred solvent.

The accelerator according to the invention or the additive containing the accelerator can also be present in the solid aggregate state, for example as a powder, flakes, pellets, granulates or laminae, and can easily be transported and stored in this form.

The accelerator according to the invention can be present, for example, in the solid aggregate state, and can be mixed with a liquefier that is also present in the solid aggregate state, and thereby can be stored over an extended period of time or transported.

The accelerator according to the invention or the additive containing the accelerator can also, in the solid aggregate state, be a component of a cement composition, a so-called dry mixture, which can be stored over an extended period of time and is typically stored packed in bags or in silos, and then used.

The accelerator according to the invention or the additive containing the accelerator can also be added to a usual concrete composition, with or shortly before or shortly after the addition of the water. In this connection, the addition of the accelerator according to the invention in the form of an aqueous solution or dispersion, particularly as make-up water or as part of the make-up water or as part of a liquid additive that is added to the hydraulic binder with the make-up water has proven to be particularly suitable.

The accelerator according to the invention or the additive can be sprayed onto the binder, the concrete, mortar, as well as non-hydraulic additives, in liquid form, also before or after grinding of the hydraulic or latently hydraulic binder. For example, the hydraulic binder can be partly coated with the accelerator or the additive containing the accelerator. This allows the production of a hydraulic binder, particularly cement or latently hydraulic slag, which already contains the accelerator or the additive containing the accelerator, and therefore can be stored and sold as a ready-to-use mixture, for example as so-called quick cement. This cement has the desired properties of rapid setting and high early strength after addition of the make-up water, without a further additive having to be added at the construction site, in addition to the make-up water.

In a further aspect, the present invention relates to a mixture containing a binder, comprising at least one hydraulically setting binder and at least one setting and hardening accelerator according to the invention. Possible binders are, for example, cement, particularly Portland cements or high-alumina cements and, respectively, their mixtures with flue ashes, silica fume, slag, foundry sands, gypsum, and limestone fillers or quicklime, a latently hydraulic powder or inert microscopic powder. Preferably, concrete compositions can be used as mixtures containing binders.

Furthermore, the mixture can contain other admixtures such as sand, gravel, stones, quartz meal, chalks, as well as usual components such as concrete liquefiers, for example lignosulfonates, sulfonated naphthalene formaldehyde condensates, sulfonated melamine formaldehyde condensates or polycarboxylate ethers (PCE), accelerators, corrosion inhibitors, delayers, shrinkage reducers, defoamers or foam formation agents as additives.

Preferably, the mixture containing the binder contains at least one liquefier in addition to the accelerator, preferably a liquefier on the basis of polycarboxylate ether (PCE).

The accelerator according to the invention is preferably used in an amount of 0.01 to 30 wt.-% with reference to the weight of the binder, in order to achieve the desired effect. Multiple accelerators can also be mixed in order to achieve the desired effect.

In another aspect, the present invention relates to a method for the production of a mixture containing a binder, where the at least one accelerator according to the invention is added to the binder separately or as an additive, premixed, in solid or liquid form.

In another aspect, the present invention relates to a method for accelerating the setting and hardening of hydraulic binders, as well as mortar or concrete produced from them, where a setting and hardening accelerator according to the invention is added to a mixture that contains hydraulic binders, in an amount of 0.01 to 30 wt.-%, preferably 0.2 to 20 wt.-%, with reference to the weight of the hydraulic binder.

With the present invention, an additive for hydraulic binders as well as a method for its production are made available, which accelerates the setting and hardening process of the hydraulic binders, without having a negative effect on the processing times, the strength development or the durability of the mortar or concrete compositions produced with it. The additive according to the invention and, in particular, the setting and hardening accelerator according to the invention, is therefore particularly suitable if it must be possible to put a load on or walk on the hydraulically setting composition very quickly after application, for example in road or bridge construction, in the prefabrication of concrete elements in the case of concrete and steel reinforced concrete prefabricated parts, or in the case of track renovations, particularly in the case of airport runways. As a result, the prefabricated parts can already be deshuttered, transported, stacked or biased, or the roadways or tracks can be driven on, after only a few hours.

EXEMPLARY EMBODIMENTS

1. Production Method Phosphonic Acid Derivative (PD) PD1 or PD2, Respectively

For the production of PD1, 2-phosphonobutane-1,2,4-tricarboxylic acid (BAYHIBIT, LANXESS International SA, Switzerland) and polyglycol methyl ether (M 500, Clariant SE, Germany) were reacted in a molar ratio of 1:2 at 100° C. and 85 mbar until a degree of esterification of 90% of all the acid groups was reached.

PD2 was produced like PD1, with the exception that M 1000 (Clariant SE, Germany) was used in place of M 500 as the polyglycol methyl ether.

2. Raw Materials Used

TABLE 1

Characterization of the raw materials used and their names.

| | | |
|---|---|---|
| CV | Ca(NO$_3$)$_2$ | Yara GmbH&Co, Germany |
| SV | sodium silicate Na$_2$SiO$_3$ | Van Baerle, Switzerland |
| PCE | comb polymer, polymethacrylic acid with polyoxyalkylene side chains | |
| MFA | Melamine formaldehyde condensate | Sikament ®-FF, Sika Österreich GmbH, Austria |
| PA1 | Polyacrylic acid | Sokalan ® PA 70 PN, BASF SE, |
| PA2 | Polyacrylic acid | Sokalan ® PA 110 S, BASF SE, Germany |
| LS | Magnesium lignin sulfonate | COLLEX 55 S 5, CHEMISCHE WERKE ZELL-WILDSHAUSEN GmbH Germany |
| NS | Sulfonated naphthalene formaldehyde condensate | FLUBE OS 39, GIOVANNI BOZZETTO S.P.A., Italy |
| GL | Glycerin | Impac AG, Switzerland |
| HGL | 2-methylpentane-2,4-diol | Hexasol ®, Arkema, France |

3. Production of the Additives

Accelerators according to the invention as well as comparison compounds were produced according to the methods A-E described below, where the raw materials used, according to Table1, were used in the ratios described in Tables 2 to 5. Production method A is a comparison method; production methods B-E are methods according to the invention.

Production Method A

A 20-percent aqueous solution CV and a 20-percent aqueous solution SV were brought together, by means of a gearwheel pump (MCP-Z, Ismatec) at 1 to 5 mL/sec, separately from one another, in a rotor-stator mixer (Megatron MT3000 with Rotor-Stator MTG 30/4, Kinematica AG) at 15,000 rpm.

Production Method B

Of the amount of PD1, or PD2, respectively, indicated in Tables 2-5, 60 wt.-%, with reference to the total weight of the PD used, were added to a 20-percent aqueous solution CV, and 40 wt.-%, with reference to the total weight of the PD used, were added to a 20-percent aqueous solution SV, and stirred for 1 min, in each instance. Afterward, the CV/PD solution as well as the SV/PD solution were brought together by means of a gearwheel pump (MCP-Z, Ismatec) at 1 to 5 mL/sec, separately from one another, in a rotor-stator mixer (Megatron MT3000 with Rotor-Stator MTG 30/4, Kinematica AG), at 15,000 rpm.

Production Method C

Of the amount of PD1, or PD2, respectively, indicated in Tables 2-5, 60 wt.-%, with reference to the total weight of the PD used, were added to a 20-percent aqueous solution CV, and 40 wt.-%, with reference to the total weight of the PD used, were added to a 20-percent aqueous solution SV, and stirred for 1 min, in each instance. Afterward, the CV/PD solution as well as the SV/PD solution were brought together by means of a gearwheel pump (MCP-Z, Ismatec) at 1 to 5 mL/sec, separately from one another, in a rotor-stator mixer (Megatron MT3000 with Rotor-Stator MTG 30/4, Kinematica AG), at 15,000 rpm.

Afterward, the reaction solution was homogenized at 50 to 950 bar, using a homogenizer (APV 1000, APV Manufacturing), in that the entire reaction solution was passed through the homogenizer once.

Production Method D

A 20-percent aqueous solution CV and a 20-percent aqueous solution SV were brought together by means of a gearwheel pump (MCP-Z, Ismatec) at 1 to 5 mL/sec, separately from one another, in a rotor-stator (Megatron MT3000 with Rotor-Stator MTG 30/4, Kinematics AG), at 15,000 rpm.

Afterward, the amount of PD1, or PD2, respectively, indicated in Tables 2-5 was added to the reaction solution and mixed by means of a vane stirrer (Eurostar P CV, Ika Labortechnik) with a vane diameter of 10 cm, at 500 rpm, for 1 min, in a 500 mL beaker.

Afterward, the reaction solution was homogenized, using a homogenizer (APV 1000, APV Manufacturing), in that the entire reaction solution was passed through the homogenizer once, completely.

Production Method E

Of the amount of PD1, or PD2, respectively, indicated in Tables 2-5, 60 wt.-%, with reference to the total weight of the PD used, were added to a 20-percent aqueous solution CV, and 40 wt.-%, with reference to the total weight of the PD used, were added to a 20-percent aqueous solution SV, and stirred for 1 min, in each instance. Afterward, the CV/PD solution was passed into a 2 L beaker that was standing under a nitrogen atmosphere, by means of a hose squeeze pump (ISM831C, Ismatec), over 20 min, in which beaker 500 mL water had been presented. The content of the 2 liter beaker was stirred, using a vane stirrer (RW 20.n, Ika Labortechnik) with a vane stirrer diameter of 5 cm, at 500 to 2000 rpm. The SV/PD solution was simultaneously passed into a rotor-stator mixer (PT2100, Polytron) by means of a hose squeeze pump (ISM831C, Ismatec), over 20 min, which mixer was also disposed in the 2 L beaker.

TABLE 2

| Accelerator (B) | TrG* | CV* | SV* | PD2* | Ca:Si | Si:Na | HV | Viscosity |
|---|---|---|---|---|---|---|---|---|
| B1 | 5.25 | 3.51 | 1.49 | 0.25 | 1.5 | 1.4 | E | n.a. |
| B2 | 5.25 | 3.36 | 1.64 | 0.25 | 1.3 | 1.4 | E | n.a. |
| B3 | 5.25 | 3.17 | 1.83 | 0.25 | 1.1 | 1.4 | E | n.a. |
| B4 | 5.25 | 2.93 | 2.07 | 0.25 | 0.9 | 1.4 | E | n.a. |
| B5 | 5.25 | 2.61 | 2.39 | 0.25 | 0.7 | 1.4 | E | n.a. |
| B6 | 5.25 | 2.87 | 2.13 | 0.25 | 1.0 | 1.0 | E | n.a. |
| B7 | 5.25 | 2.97 | 2.03 | 0.25 | 1.0 | 1.2 | E | n.a. |
| B8 | 5.25 | 3.06 | 1.94 | 0.25 | 1.0 | 1.4 | E | n.a. |
| B9 | 5.25 | 3.11 | 1.89 | 0.25 | 1.0 | 1.55 | E | n.a. |
| B10 | 5.25 | 3.15 | 1.85 | 0.25 | 1.0 | 1.7 | E | n.a. |

* = wt.-%, with reference to the total weight of the accelerator B.

TABLE 3

| Accelerator (B) | TrG* | CV* | SV* | PD1* | Ca:Si | Si:Na | HV | Viscosity |
|---|---|---|---|---|---|---|---|---|
| B11 | 20 | 14.05 | 5.95 | 0 | 1.5 | 1.4 | A | − |
| B12 | 20.5 | 14.05 | 5.95 | 0.5 | 1.5 | 1.4 | B | ++ |
| B13 | 20.75 | 14.05 | 5.95 | 0.75 | 1.5 | 1.4 | B | +++ |
| B14 | 21 | 14.05 | 5.95 | 1 | 1.5 | 1.4 | B | +++ |
| B15 | 22 | 14.05 | 5.95 | 2 | 1.5 | 1.4 | B | +++ |
| B16 | 20 | 14.05 | 5.95 | 0 | 1.5 | 1.4 | A | − |
| B17 | 21 | 14.05 | 5.95 | 1 | 1.5 | 1.4 | D | +++ |
| B18 | 21 | 14.05 | 5.95 | 1 | 1.5 | 1.4 | B | +++ |
| B19 | 21 | 14.05 | 5.95 | 1 | 1.5 | 1.4 | C | + |

* = wt.-%, with reference to the total weight of the accelerator B.

TABLE 4

| | Accelerator (B) | | | |
|---|---|---|---|---|
| | B20 | B21 | B22 | B23 |
| CV* | 14.05 | 14.05 | 14.05 | 14.05 |
| SV* | 5.95 | 5.95 | 5.95 | 5.95 |
| PCE* | 1.0 | | | |
| MFA* | | 0.8 | | |
| PA1* | | | 0.6 | |
| PA2* | | | | 0.72 |
| Ca:Si | 1.5 | 1.5 | 1.5 | 1.5 |
| Si:Na | 1.4 | 1.4 | 1.4 | 1.4 |
| HV | D | D | D | D |
| Viscosity | (-)/(-) | (-)/(-) | (-)/(-) | (--)/(--) |

*= wt,-%, with reference to the total weight of the accelerator B.

TABLE 5

| | Accelerator (B) | | | |
|---|---|---|---|---|
| | B24 | B25 | B26 | B27 |
| CV* | 14.05 | 14.05 | 14.05 | 14.05 |
| SV* | 5.95 | 5.95 | 5.95 | 5.95 |
| LS* | 1.1 | | | |
| NS* | | 0.8 | | |
| GL* | | | 0.86 | |
| HGL* | | | | 1.0 |
| Ca:Si | 1.5 | 1.5 | 1.5 | 1.5 |
| Si:Na | 1.4 | 1.4 | 1.4 | 1.4 |
| HV | D | D | D | D |
| Viscosity | (-)/(-) | (-)/(-) | (-)/(-) | (-)/(-) |

*= wt.-%, with reference to the total weight of the accelerator B.

The wt.-% (*) indicated in Tables 2-5 relate to the dry weight of PD1, PD2, CV, SV, PCE, MFA, PA1, PA2, LS, NS, GL and HGL with reference to the total weight of the end product (accelerator B). Ca:Si stands for the molar ratio of calcium:silicon, Si:Na stands for the molar ration of $SiO_2$:

Na$_2$O of the sodium water glass used, Na$_2$SiO$_3$. TrG stands for the proportion of the dry mass of the accelerator, in wt.-%, with reference to the total weight of the accelerator. HV indicates the production method according to which the accelerator was produced.

For determining the viscosity of the accelerators, 100 g of the accelerator (Production method A and D: directly after production; Production method B and C: 24 h after production) were placed in a 200 mL beaker (fill height 3 to 5 cm), the accelerator was pushed through to the bottom of the beaker with a wooden tongue depressor, using the broad side, and, while maintaining contact with the bottom, the tongue depressor was moved once across through the accelerator. The viscosity was optically evaluated as follows:

(−−) Solid; viscosity so great that drawing a wooden tongue depressor through with the broad side is not possible or only possible with great exertion of effort, viscosity not measured. The term "measured viscosity" is understood to mean, in the following, viscosities measured with a rotation viscosimeter from Brookfield, Model RVT (measurement with spindle 2, 3, 4 or 5 at 100 rpm).

(−) Set; after drawing a wooden tongue depressor through with the broad side, the bottom of the beaker remains visible for at least 20 sec, viscosity>3000 mPa·s.

(+) Paste-like; after drawing a wooden tongue depressor through with the broad side, the bottom of the beaker remains visible for 1-5 sec, measured viscosity 750-3000 mPa·s.

(++) Honey-like; after drawing a wooden tongue depressor through with the broad side, the bottom of the beaker remains visible for less than 1 sec, measured viscosity 400-750 mPa·s.

(+++) Liquid; after drawing a wooden tongue depressor through with the broad side, the bottom of the beaker is not visible, measured viscosity≤400 mPa·s.

The accelerators B1-B10, B12-B15 and B17-B19 are accelerators according to the invention, the accelerators B11, B16 and B20-B27 are comparison examples.

In Table 3, the results of B11-B15 show that the viscosity of the accelerators produced improves greatly when PD (B12-B15) is added, in comparison with the accelerator without PD (B11). Particularly advantageous viscosities are obtained at a proportion of PD1 of 0.75-2 wt.-%.

The results of B16-B19 show that the viscosity of the accelerators produced according to one of the methods B, C or D according to the invention is greatly improved in comparison with the accelerator produced according to the comparison method A, which does not provide for any addition of PD. Particularly advantageous viscosities are obtained with the methods D and B.

Tables 4 and 5 show comparison examples of accelerators that were produced analogous to the accelerator B17, with the difference that instead of PD1, the amounts of a common dispersant used in accelerators, as indicated in Tables 4 and 5, were added. From the results of the viscosities, it is evident that the addition of a phosphonic acid derivatives having the formula (I), according to the invention, greatly improves the viscosity of the accelerator B17 produced, in comparison with the common dispersants used in accelerators.

4. Mortar Tests

The efficacy of the accelerators B1-B10, B12-B15 and B17-B19 according to the invention as well as of the comparison examples B11 and B16 were tested in mortar.

| Composition of the mortar mixture (MM): (largest grain 8 mm) | Amount in g |
|---|---|
| Portland cement (SVW CEM I 42.5N) | 750 |
| Limestone filler | 141 |
| Sand 0-1 mm | 738 |
| Sand 1-4 mm | 1107 |
| Sand 4-8 mm | 1154 |

As cement, SVW (Swiss cement grades Siggenthal, Vigier, Wildegg, 1:1:1 mixture) CEM I 42.5N was used, which has a fineness according to Blaine of approx. 3400 cm$^2$/g.

The sands, the filler, and the cement were dry-mixed in a Hobart mixer for 1 minute. Within 30 seconds, the make-up water, in which the accelerator was dissolved or dispersed, was added, and stirring continued for another 2.5 minutes. The total mixing time was 3 minutes. The water/cement value (w/c value) amounted to 0.4.

In addition, 1 wt.-% of a liquefier (Sika ViscoCrete 3081S, which can be obtained from Sika Schweiz AG, Switzerland) was added, in order to improve the processability of the mortar mixtures.

To determine the efficacy of the accelerator according to the invention, the mortar mixtures MM were mixed with the different accelerators of Tables 2 and 3 (see Table 6). The mortar compositions (MZ) MZ2-MZ6, MZ8-MZ12, MZ15-MZ18 and MZ21-MZ23 represent examples according to the invention, while the mortar compositions MZ1, MZ7, MZ13, MZ14, MZ19 and MZ20 represent comparison examples.

To determine the efficacy of the accelerator according to the invention or of the additive, the flow table spread (ABM) and the pressure strength were determined in Table 6.

TABLE 6

| Accelerator/ wt.-%* | ABM after 1 min | Pressure strength (MPa) 8 h | Comparison with MZ1 (%) 8 h | Pressure strength (MPa) 24 h | Comparison with MZ1 (%) 24 h |
|---|---|---|---|---|---|
| MZ1 | — | 191 | 1.4 | — | 30.6 | — |
| MZ2 | B1/16 | 172 | 2.4 | 71 | 35.5 | 16 |
| MZ3 | B2/16 | 160 | 2.6 | 86 | 36.0 | 18 |
| MZ4 | B3/16 | 153 | 2.5 | 79 | 36.1 | 18 |
| MZ5 | B4/16 | 152 | 3.1 | 121 | 36.3 | 19 |
| MZ6 | B5/16 | 143 | 3.0 | 114 | 34.8 | 14 |

| Accelerator/ wt.-%* | ABM after 1 min | Pressure strength (MPa) 8 h | Comparison with MZ7 (%) 8 h | Pressure strength (MPa) 24 h | Comparison with MZ7 (%) 24 h |
|---|---|---|---|---|---|
| MZ7 | — | 193 | 1.3 | — | 31.9 | — |
| MZ8 | B6/16 | 131 | 5.9 | 354 | 38.2 | 20 |
| MZ9 | B7/16 | 156 | 3.3 | 154 | 36.3 | 14 |
| MZ10 | B8/16 | 157 | 2.5 | 92 | 37.7 | 18 |
| MZ11 | B9/16 | 155 | 2.3 | 77 | 38.1 | 19 |
| MZI2 | B10/16 | 158 | 2.3 | 77 | 36.2 | 14 |

| Accelerator/ wt.-%* | ABM after 1 min | Pressure strength (MPa) 8 h | Comparison with MZ13 (%) 8 h | Pressure strength (MPa) 24 h | Comparison with MZ13 (%) 24 h |
|---|---|---|---|---|---|
| MZ13 | — | 195 | 1.0 | — | 33 | — |
| MZ14 | B11/4 | 150 | 4.0 | 300 | 38 | 15 |
| MZ15 | B12/4 | 178 | 2.0 | 100 | 36 | 9 |
| MZ16 | B13/4 | 193 | 1.9 | 90 | 34 | 3 |
| MZ17 | B14/4 | 184 | 1.8 | 80 | 30 | −9 |
| MZ18 | B15/4 | 182 | 1.3 | 30 | 33 | 0 |

TABLE 6-continued

| Accelerator/ wt.-%* | ABM after 1 min | Pressure strength (MPa) 8 h | Comparison with MZ19 (%) 8 h | Pressure strength (MPa) 24 h | Comparison with MZ19 (%) 24 h |
|---|---|---|---|---|---|
| MZ19 | — | 195 | 1.0 | — | 33 | — |
| MZ20 | B16/4 | 150 | 4.0 | 300 | 38 | 14 |
| MZ21 | B17/4 | 148 | 3.6 | 260 | 37 | 13 |
| MZ22 | B18/4 | 184 | 1.8 | 80 | 30 | −8 |
| MZ23 | B19/4 | 170 | 2.3 | 130 | 38 | 16 |

* = wt.-%, with reference to the total weight of the mortar composition MZ (including make-up water), flow table spread (ABM) in mm after 1 minute (min).

The flow table spread (ABM) of the mortar was determined according to EN 1015-3. The determination took place after 1 min. The test for determining the pressure strength (in N/mm²) took place by means of prisms (40×40×160 mm) after 8 hours and 24 hours, according to EN 196.1 and EN 12190.

For use in road or bridge construction, in the prefabrication of concrete elements in concrete and reinforced concrete prefabricated parts, or in track renovations, where the prefabricated parts must already be deshuttered, transported, stacked or biased after a few hours, or it must be possible to drive on the roadways or tracks, great strength values after 8 and 24 hours, respectively, are of the greatest importance.

The results of MZ1-MZ6 show that the mortar compositions MZ3 and MZ4, which have a molar ratio of calcium:silicon of 0.9-1.2, on the basis of the accelerators B3 and B4, respectively, are characterized by a good flow table spread with simultaneously great pressure strength after 8 h.

Furthermore, the results of MZ7-MZ12 show that the mortar compositions MZ8, MZ9 and MZ10, which have a sodium silicate with a molar ratio of $SiO_2:Na_2O=1.0-1.5$, on the basis of the accelerators B6, B7, and B8, respectively, are characterized by a good flow table spread with simultaneously great pressure strength after 8 h.

The invention claimed is:

1. A method for the production of a setting and hardening accelerator for hydraulic binders, comprising the steps of:

(i) reacting a calcium compound CV with a silicon compound SV; and (ii) adding a phosphonic acid derivative having the formula (I)

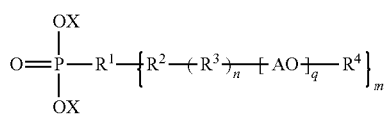

wherein X stands for H⁺, alkali metal ion, earth alkali metal ion, bivalent or trivalent metal ion, ammonium ion, organic ammonium group or a radical having the formula (II)

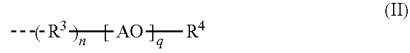

wherein $R^1$ stands for an organic radical with 1 to 10 C atoms, $R^2$ independent of one another stands for

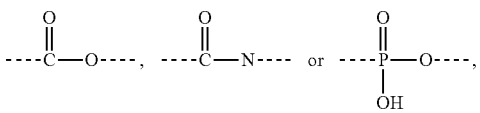

$R^3$ stands for an alkyl group with 1 to 6 C atoms, and $R^4$ stands for H, an alkyl group, an alkyl aryl group, wherein the substituent A, independent of one another, stands for a C2 to C4 alkylene group, q is a value from 2 to 300 m is a value from 1 to 4 n is a value from 0 to 1, wherein the calcium compound CV is selected from the group consisting of calcium chloride, calcium nitrate, calcium formiate, calcium acetate, calcium bicarbonate, calcium bromide, calcium citrate, calcium chlorate, calcium hydroxide, calcium oxide, calcium hypochloride, calcium iodates, calcium iodide, calcium lactate, calcium nitrite, calcium phosphate, calcium propionate, calcium sulfate, calcium sulfate-hemihydrate, calcium sulfate-dihydrate, calcium sulfide, calcium tartrate, calcium gluconate, calcium sulfamate, calcium maleinate, calcium fumarate, calcium adipate, and calcium aluminate, and the silicon compound SV is selected from the group consisting of sodium silicate, potassium silicate, lithium silicate, water glass, silicic acid, sodium metasilicate, potassium metasilicate, di-sodium metasilicate, di-potassium metasilicates, silicon dioxide, di-sodium disilicate and di-sodium trisilicate.

2. The method according to claim 1, wherein in Step (i), the reaction of the calcium compound CV with the silicon compound SV takes place in the presence of water.

3. The method according to claim 2, wherein the calcium compound CV and the silicon compound SV are added to the water separately from one another.

4. The method according to claim 1, wherein the proportion of the phosphonic acid derivative having the formula (I) amounts to 0.01-10 wt.%, with reference to the total weight of the setting and hardening accelerator.

5. The method according to claim 1, wherein in the course of the implementation of Step (i), the following molar ratios are present: calcium:silicon=0.5-2.0.

6. The method according to claim 1, wherein the silicon compound SV is sodium silicate with a molar ratio of $SiO_2$:$Na_2O=0.5-4.0$.

7. The method according to claim 1, wherein the calcium compound CV is calcium nitrate and a silicon compound SV is sodium silicate, where the molar ratio during the implementation of Step (i) amounts to calcium nitrate:sodium silicate=0.25-8.0.

8. The method according to claim 1, wherein the method further comprises Step (v) comminution of the reaction product from Step (i).

9. The method according to claim 8, wherein Step (v) leads to an average particle size of the reaction product of 1000-10 nm.

10. The method according to claim 8, wherein the comminution of the reaction product from Step (i) occurs by means of stirrer mills, roller stands, colloid mills and/or homogenizers.

11. The method according to claim 1, wherein q is a value from 2 to 50.

12. A setting and hardening accelerator produced according to a method according to claim 1.

13. A mixture comprising at least one hydraulically setting binder and at least one setting and hardening accelerator according to claim 12.

14. A method for acceleration of the setting and hardening of a hydraulic binder by means of the addition of a setting and hardening accelerator, obtained from the method according to claim 1, wherein 0.01 to 30 wt. % of the setting and hardening accelerator, with reference to the weight of this binder, is added to a mixture that contains the stated hydraulic binder.

* * * * *